US009607815B2

(12) United States Patent
Lee et al.

(10) Patent No.: US 9,607,815 B2

(45) Date of Patent: Mar. 28, 2017

(54) LOW WORK-FUNCTION, MECHANICALLY AND THERMALLY ROBUST EMITTER FOR THERMIONIC ENERGY CONVERTERS

(71) Applicant: The Board of Trustees of the Leland Stanford Junior University, Palo Alto, CA (US)

(72) Inventors: Jae Hyung Lee, Palo Alto, CA (US); Igor Bargatin, Wynnewood, PA (US); Bernard Vancil, Beaverton, OR (US); Roger T. Howe, Los Gatos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 330 days.

(21) Appl. No.: 14/485,423

(22) Filed: Sep. 12, 2014

(65) Prior Publication Data

US 2015/0325419 A1 Nov. 12, 2015

Related U.S. Application Data

(60) Provisional application No. 61/877,247, filed on Sep. 12, 2013.

(51) Int. Cl.

*H02N 10/00* (2006.01)

*H01J 45/00* (2006.01)

(52) U.S. Cl.

CPC .................................... *H01J 45/00* (2013.01)

(58) Field of Classification Search

CPC .......... H01J 45/00; H02S 40/40; H02S 40/22; H01L 35/22; H01L 35/34; H01L 35/30; H01L 35/16

USPC .................................................. 310/306, 307

See application file for complete search history.

(56) References Cited

U.S. PATENT DOCUMENTS

| | | | | |
|---|---|---|---|---|
| 3,322,979 | A | 5/1967 | Clendinning et al. | |
| 3,373,307 | A | 3/1968 | Zalm et al. | |
| 4,302,702 | A | 11/1981 | Montgaillard et al. | |
| 4,368,416 | A | 1/1983 | James | |
| 6,294,858 | B1 | 9/2001 | King et al. | |
| 6,509,669 | B1 | 1/2003 | King et al. | |
| 7,235,912 | B2 * | 6/2007 | Sung | H01L 37/00 136/200 |
| 7,323,709 | B2 * | 1/2008 | Tavkhelidze | F25B 21/00 257/104 |
| 7,508,110 | B2 * | 3/2009 | Chen | H01J 45/00 136/206 |
| 2002/0024050 | A1 * | 2/2002 | Odekirk | H01L 21/0485 257/77 |
| 2003/0184188 | A1 * | 10/2003 | Kucherov | H01J 45/00 310/306 |

(Continued)

OTHER PUBLICATIONS

National Research Council, "Thermionics Quo Vadis? An assessment of the DTRA's Advanced Thermionics Research and Development Program", 2001.

*Primary Examiner* — Hanh Nguyen

(74) *Attorney, Agent, or Firm* — Lumen Patent Firm

(57) ABSTRACT

Improved thermionic energy converters are provided by electrodes that include a silicon carbide support structure, a tungsten adhesion layer disposed on the silicon carbide support structure, and an activation layer disposed on the tungsten adhesion layer. The activation layer is a material that lowers the electrode work function, such as BaO, SrO and/or CaO.

9 Claims, 20 Drawing Sheets

(56) References Cited

U.S. PATENT DOCUMENTS

| | | | | |
|---|---|---|---|---|
| 2004/0050415 A1* | 3/2004 | Kucherov | ............... | H01L 35/00 136/252 |
| 2011/0226299 A1* | 9/2011 | Makansi | ................. | H01J 45/00 136/203 |
| 2015/0075579 A1* | 3/2015 | Kataoka | .................. | H01J 45/00 136/205 |

* cited by examiner

LOW WORK-FUNCTION, MECHANICALLY AND THERMALLY ROBUST EMITTER FOR THERMIONIC ENERGY CONVERTERS

CROSS REFERENCE TO RELATED APPLICATIONS

This application claims the benefit of U.S. provisional patent application 61/877,247, filed on Sep. 12, 2013, and hereby incorporated by reference in its entirety.

GOVERNMENT SPONSORSHIP

This invention was made with Government support under contract number W91CRB-10-1-0001 awarded by the Department of the Army. The Government has certain rights in this invention.

FIELD OF THE INVENTION

This invention relates to thermionic energy conversion.

BACKGROUND

Thermionic energy converters (TECs) are heat engines that convert heat directly to electricity at very high temperatures, typically >1000° C. Electrons are thermionically emitted from a hot emitter and collected at a relatively cool collector, effectively playing the role of the working fluid. FIG. 1A shows the basic configuration for this effect. An emitter electrode 102 is heated (shown schematically by arrows 108). Electrons 110 emitted by emitter electrode 102 are collected by collector electrode 104. The resulting electrical potential difference $V_0$ can provide power to a load 106.

The corresponding energy diagram is shown on FIG. 1B. Here $E_{F,E}$ and $E_{F,C}$ are the Fermi levels of the emitter and the collector, respectively. $E_{vac,E}$ and $E_{vac,C}$ are the vacuum levels of the emitter and the collector, respectively. $\phi_E$ and $\phi_C$ are the work functions of the emitter and the collector. $V_0$ is the voltage difference between the two electrodes and $-q$ is the electron charge. Heating the emitter provides a distribution of electron energies in the emitter, schematically shown by curve 120 on FIG. 1B. Electrons having energy higher than $E_{vac,E}$ can escape from the emitter and be collected by the collector electrode. The theoretical efficiency of a TEC can exceed that of other solid-state technologies, such as thermoelectric converters, and can even be competitive with state-of-the art mechanical heat engines, such as steam turbines or Stirling engines.

Thermionic energy conversion was proposed in 1915. In 1941, Soviet researchers Gurtovoy and Kovalenko made the first laboratory converter, and in 1957, Hernqvist and co-workers at RCA demonstrated a practical converter with an efficiency of several percent. Hatsopoulos described various types of thermionic converters in his doctoral thesis at the Massachusetts Institute of Technology in 1956 and a subsequent two-volume monograph. Also in 1956, Moss published a review paper on using thermionic diodes as energy converters in the UK.

Since then, hundreds of papers on thermionic energy conversion have been published in the scientific and engineering literature. Intensive development during the 1960s-1970s for space applications culminated in the TOPAZ-II, a 6 kW converter, which was flown in 1987 by the Soviet space program. TOPAZ-II could operate for many years at up to 10 percent efficiency and had an emitter-collector gap of the order of 100 microns.

Although it was established in the 1950s that TECs with micron-scale gaps (<10 μm) are theoretically superior to their macroscopic counterparts, it was not until the last few decades that the development of MEMS process techniques enabled their fabrication. King and colleagues at Sandia National Laboratories proposed that thermionic energy converters could be microfabricated using MEMS wafer bonding processes. The authors suggested that the remaining hurdle was the development of low work-function materials and processes that could be integrated into these converters, in order to allow operation at relatively low temperatures (800-1300K). Subsequent modeling and fabrication efforts focused on micro-dispenser emitters for use in micro-miniature thermionic converters. Zhang and colleagues from the University of Michigan also fabricated a microfabricated thermionic converter combined with a combustion heat source in 2003. Thick silicon dioxide layers were used for thermal isolation and operation at high combustion temperatures (1000° C.) with large temperature gradients (50-100K per 100 μm) was demonstrated. In these microfabricated implementations, parasitic heat loss from emitter to collector was a major problem, limiting the conversion efficiency to a small fraction of 0.5%. In fact, a US government study in 2001 concluded that an efficient microfabricated thermionic energy converter is implausible because "it would be extremely difficult to maintain, for any reasonable period of time, a temperature difference of nearly 1000 K between two surfaces held apart by a miniaturized spacer that is a few microns thick".

SUMMARY

We have found that silicon carbide (SiC) has suitable thermal and mechanical properties for TEC electrodes. It can withstand very high temperatures and can be fabricated into structures that can maintain a small electrode gap at extreme temperatures. However, silicon carbide has a work function that is undesirably large for TEC electrode applications. A straightforward attempt to reduce the SiC work function (e.g., by coating with Barium) tends to fail because of lack of adhesion of the Ba coating to SiC. This adhesion problem has been solved by using an intermediate layer of tungsten (W) between the SiC structure and the activation layer. The W/SiC structure is suited for various work-function lowering coatings, including but not limited to: SrO deposited by atomic layer deposition (ALD), ALD-deposited BaO and BaO/SrO/CaO liquid.

An exemplary embodiment of the invention includes a collector electrode and an emitter electrode, where one or both of these electrodes includes a silicon carbide support structure, a tungsten adhesive layer disposed on the silicon carbide support structure, and an activation layer disposed on the tungsten adhesion layer. The activation layer can include any material suitable for lowering the work function. Alkaline earth oxides such as strontium oxide, calcium oxide and barium oxide are suitable activation layer materials. As indicated below, in operation at elevated temperatures the tungsten can oxidize by taking some of the oxygen from the alkaline earth oxide, thereby producing elemental metals (e.g., Sr, Ba, Ca) in combination with the oxide. Such production of metals is expected to be helpful in reducing the work function. FIG. 2 shows an exemplary configuration. Here 202 is the SiC support structure, 204 is the tungsten adhesion layer and 206 is the activation layer.

Incident thermal energy is schematically shown by arrows 208, and optional incident optical energy is schematically shown by arrows 210. Electrons 212 can escape from this electrode as described above.

In preferred embodiments, the silicon carbide support structure is suspended above a wafer substrate and includes one or more support members having a U-shaped cross section to provide mechanical rigidity. Conformal sidewall deposition of poly-SiC can be used to provide stiff suspension legs of SiC with U-shaped cross sections to increase the out-of-plane rigidity. This rigidity can prevent undesirable contact between emitter and substrate during the heating of the suspended emitter up to 3000K.

The thickness of the tungsten adhesion layer is preferably between 2.5 nm and 15 nm. The gap between the emitter electrode and the collector electrode is preferably less than about 10 microns. The TEC device is preferably enclosed in a hermetically sealed package enclosing at least the emitter electrode and the collector electrode. For hermetically sealed devices, the pressure is preferably 1 Torr or less between the emitter electrode and the collector electrode (i.e., inside the package).

This work provides an improved TEC electrode structure that is mechanically stable and which also has a stable and robust surface coating to provide efficient thermionic emission. These desirable properties are maintained at the high temperatures (e.g. 1500 K or higher) needed for efficient thermionic energy converter operation.

Such structures have various applications, such as the emitter of a TEC, the collector of a TEC, and the collector for a photon enhanced thermionic energy (PETE) converter. Photon enhanced thermionic energy converters are described in US 2010/0139771, hereby incorporated by reference in its entirety. Briefly, in a PETE device the emitter is both heated and optically illuminated in order to increase electron emission by a combination of the thermionic and photoelectric effects. Note that the temperature of the collector can be 400K-1000K based on its application and the emitter temperature is usually much higher. Even though the collector is cold relative to the emitter, it still needs to have a design suitable for operation at elevated temperatures.

This work provides significant advantages. We provide a solution for the needs of low work-function, mechanically and thermally robust emitter for thermionic energy converters. Our emitters operated stably even at temperatures above 1500 K.

DETAILED DESCRIPTION

In this description, several experiments relating to the above-described principles are described. Section I relates to fabrication, section II provides the experimental results, and section III give the conclusions.

I. Fabrication

A. Mechanically Robust Suspended Micro-Emitters

Figure 1A:
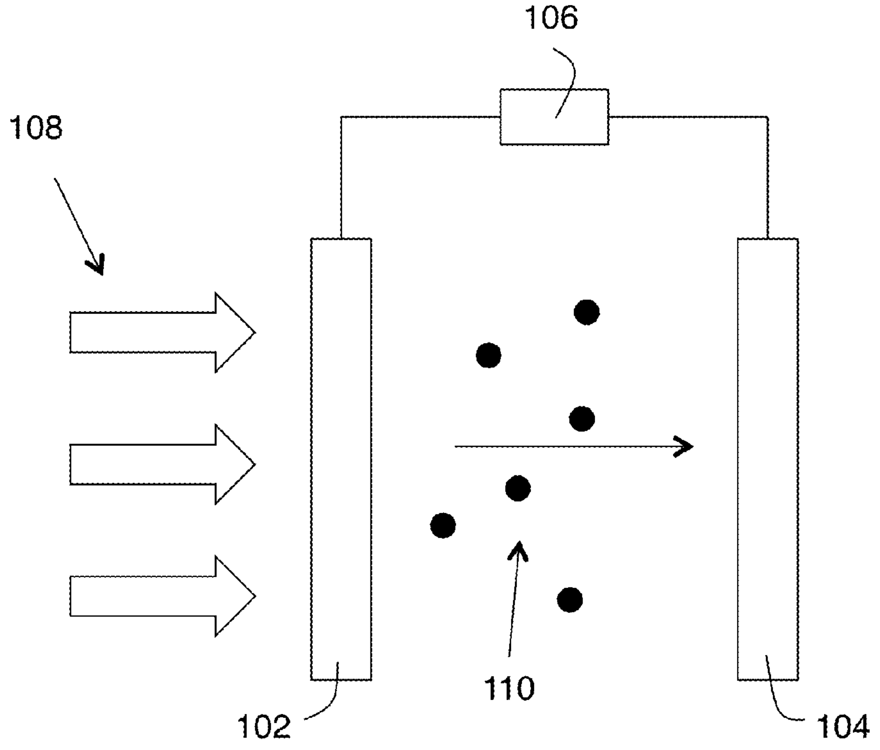
FIG. 1A (prior art)
FIGS. 1A-B show the physics of thermionic energy conversion.
Figure 1B:
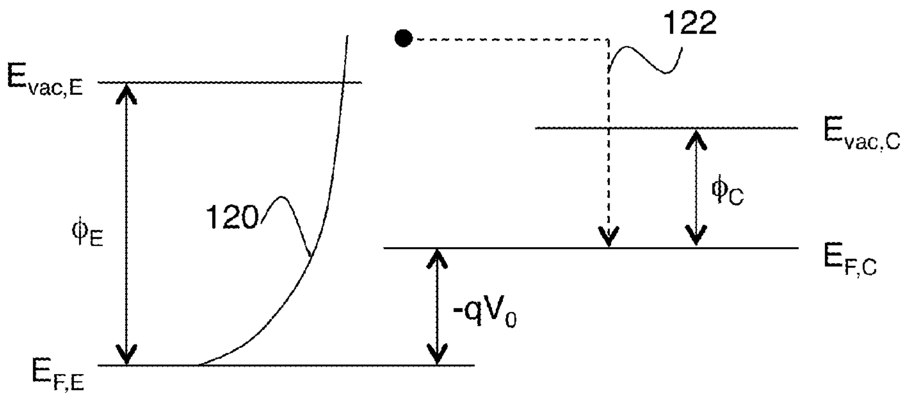
FIG. 1B (prior art)
Figure 2:
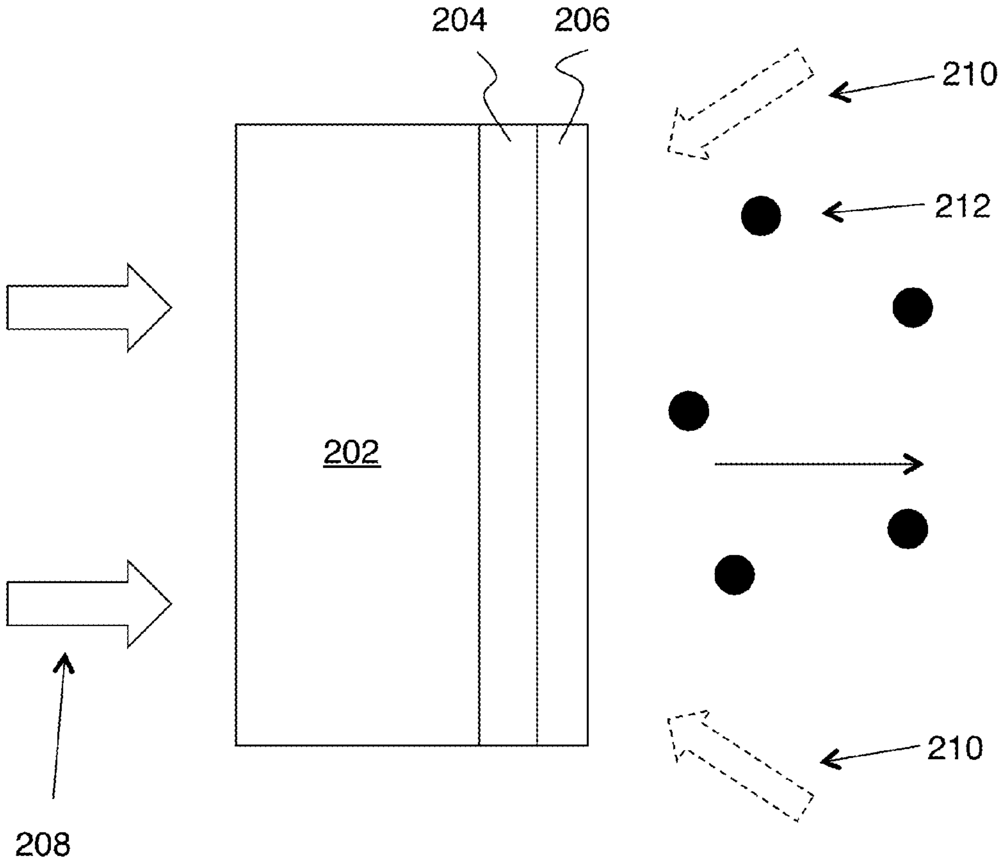
FIG. 2 shows an exemplary embodiment of the invention.
Figure 3A:
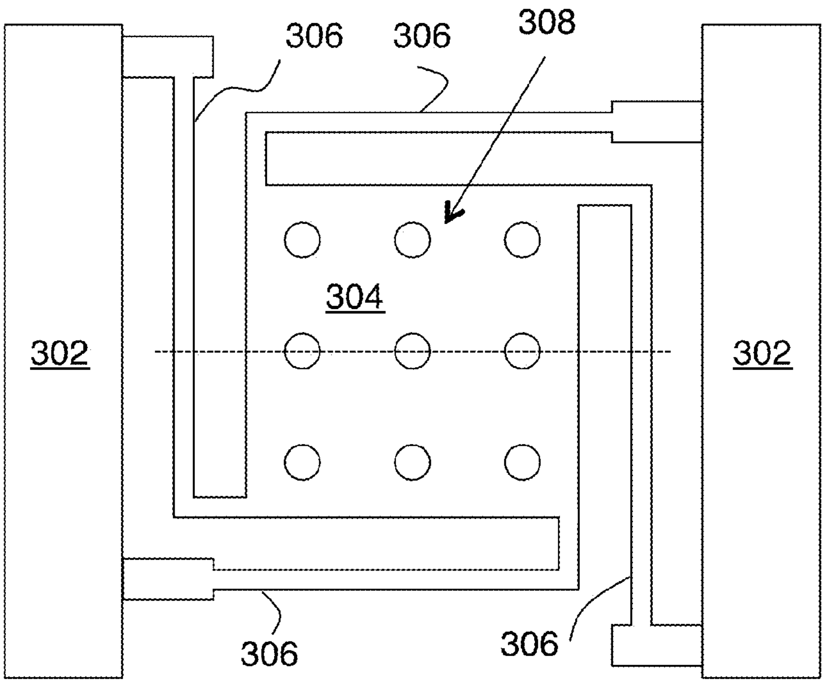
FIGS. 3A-B show an exemplary electrode structure.
Figure 3B:
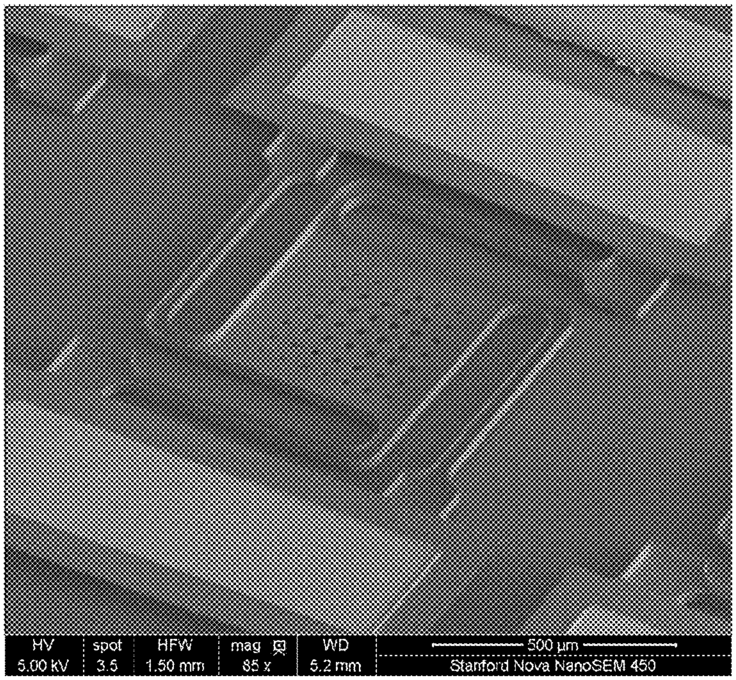

The emitter was configured as a silicon carbide (SiC) center pad 304 suspended above the substrate using four SiC crab-leg beams 306 as shown on FIGS. 3A-B. Here 302 are the support posts and 308 are holes in the center pad 304 to facilitate the undercut etch to form the suspended structure. This design accommodates thermal expansion of the order of 1% that occurs at the typical operating temperatures of 1000° C.-2500° C. It also provides a high thermal resistance between center pad 304 and support posts 302, which is important. We used a conformal sidewall deposition of poly-SiC to form stiff suspension legs with U-shaped cross sections, which increases the out-of-plane rigidity and avoids contact with the substrate during heating. This stiff suspension maintains a stable emitter-collector gap and enables heating the emitter to higher temperatures without it touching the substrate. FIG. 3B is a scanning electron micrograph (45° angle) of a microfabricated TEC. The width of the suspended crab legs was 10 μm, the height of the sidewall was 30 μm, and the center pad was 500 μm×500 μm.

Figure 4A:
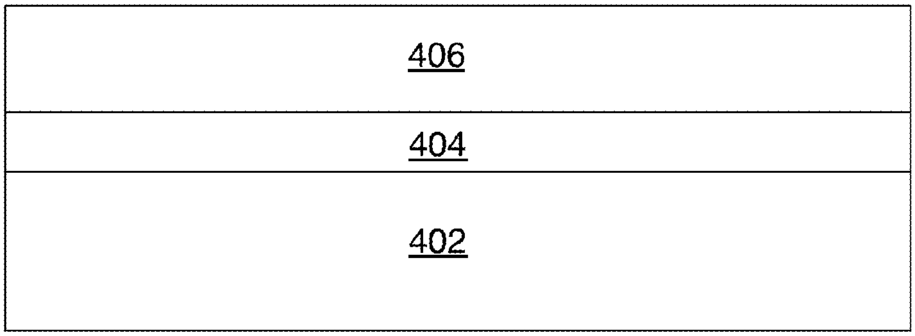
FIGS. 4A-H and 4J-K show a first exemplary fabrication sequence.
Figure 4B:
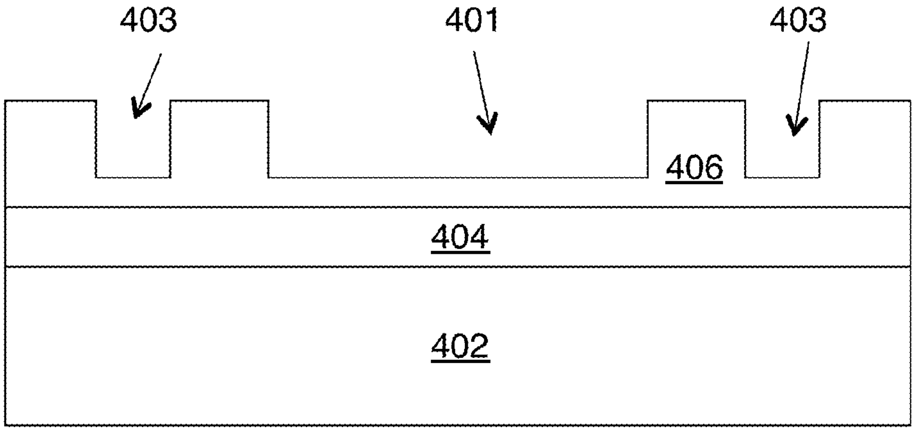
Figure 4C:
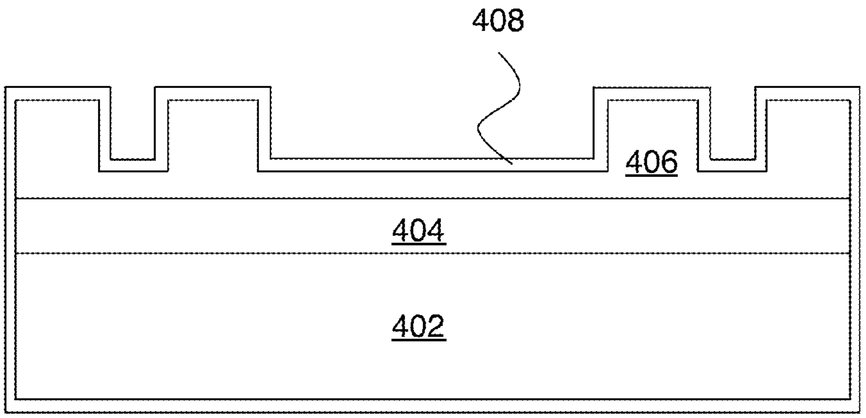

FIGS. 4A-H and 4J-K provide cross sections through an exemplary μ-TEC fabrication process, along the dashed line of FIG. 3A. FIG. 4A shows the starting point, which in this case was a 4-inch diameter silicon on insulator (SOI) wafer. Here 402 is the silicon substrate, 404 is the buried oxide (4 μm thick), and 406 is the top silicon layer (35 μm thick). FIG. 4B shows the result of patterning and DRIE (deep reactive ion etching) etching to define 30 μm-deep silicon trenches. Here trenches 403 will eventually define the crab-leg support members and trench 401 will define the center pad of the electrode. FIG. 4C shows the result of depositing a 2-μm-thick film of n-type polycrystalline 3C-SiC 408 using chemical vapor deposition. SiC 408 will eventually become the SiC support structure of the examples of FIGS. 4K and 5.

Figure 4D:
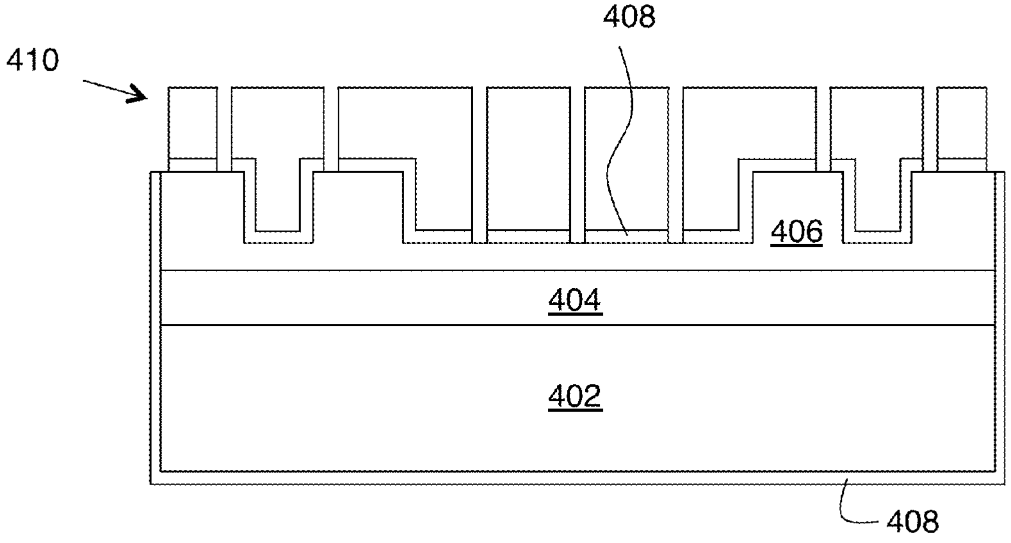

FIG. 4D shows the result of applying thick (>10 μm thickness) photoresist (PR) 410 via spin coating to overcome the deep trench features and cover the wafer with the PR entirely. This photoresist was then patterned as shown to etch SiC layer 408 by anisotropic reactive ion etching (RIE). However, the very edges of the trench were not well protected, and got roughened though the dry etch process. A PR spray coating could be an alternative to PR spin coating. However, spray coated PR was more vulnerable to PR burning while dry etching the poly-SiC. Thus, after the PR development, the wafer with PR was baked at 90° C. for 4 hours followed by UV bake for another 20 min to avoid the PR burning issue. We note that if thick PR was baked at a higher temperature of 110° C., it started to crack. After the PR hardened, the poly-SiC was etched to define the emitter structures. Each emitter was separated from the other emitters, enabling them to be tested independently.

Figure 4E:
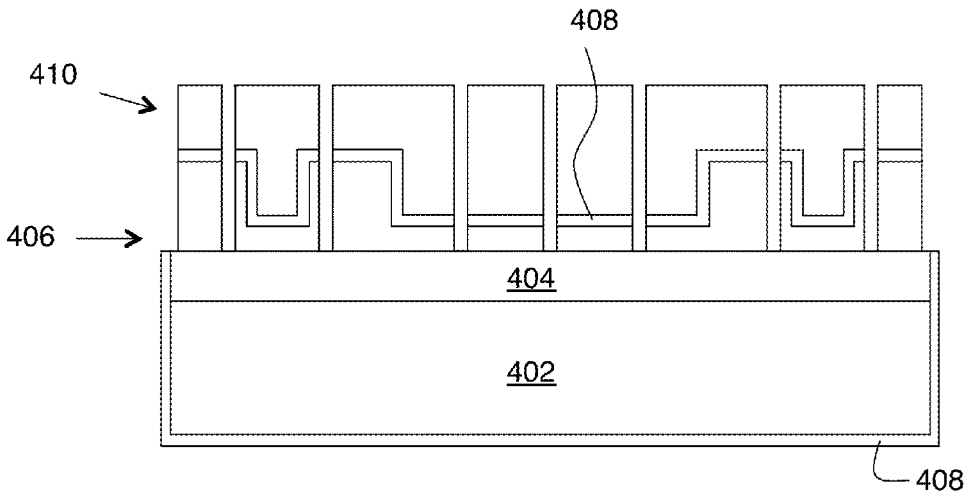
Figure 4F:
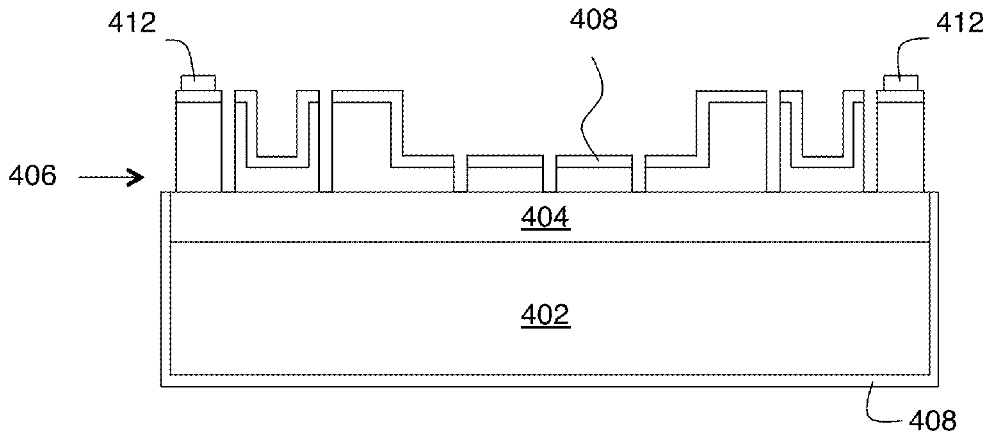
Figure 4G:
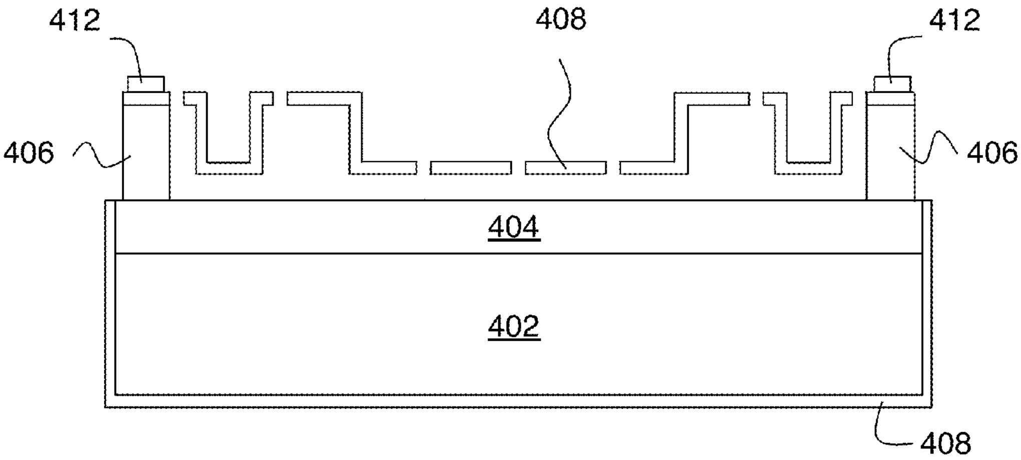
Figure 4H:
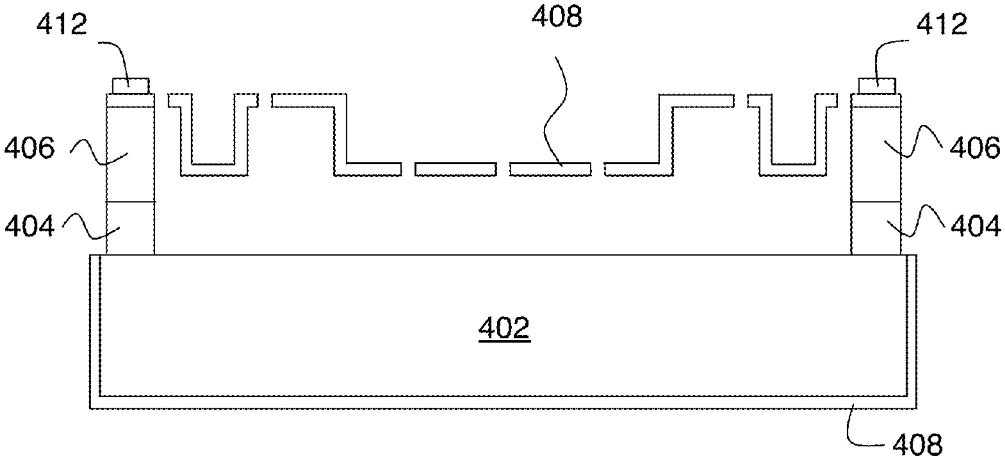

FIG. 4E shows the result of DRIE of exposed silicon to minimize undercutting at the contact areas. FIG. 4F shows removal of photoresist 410 and deposition of gold contacts 412. FIG. 4G shows the result of an isotropic silicon etch using $XeF_2$ to etch down to the middle buried oxide layer 404. FIG. 4H shows the result of a vapor HF etch of the buried oxide layer 406 which was used to define the gap between support structure 408 and the silicon substrate collector 402.

Together the steps of FIGS. 4G and 4H amount to a two-stage release process for the emitter. Etch holes (e.g., 308 on FIG. 3A) were used to facilitate the release of the emitter plate throughout these two steps. The width of the suspended legs (306 on FIG. 3A) were 10-30 μm, the height of the sidewall was 30 μm, the emitter plate was 500 μm×500 μm, and the poly-SiC film was 2 μm thick. The diameters of the etch holes were 10-30 μm and the emitter-collector gap of 5-10 μm was selected to maximize the calculated conversion efficiency.

Figure 4J:
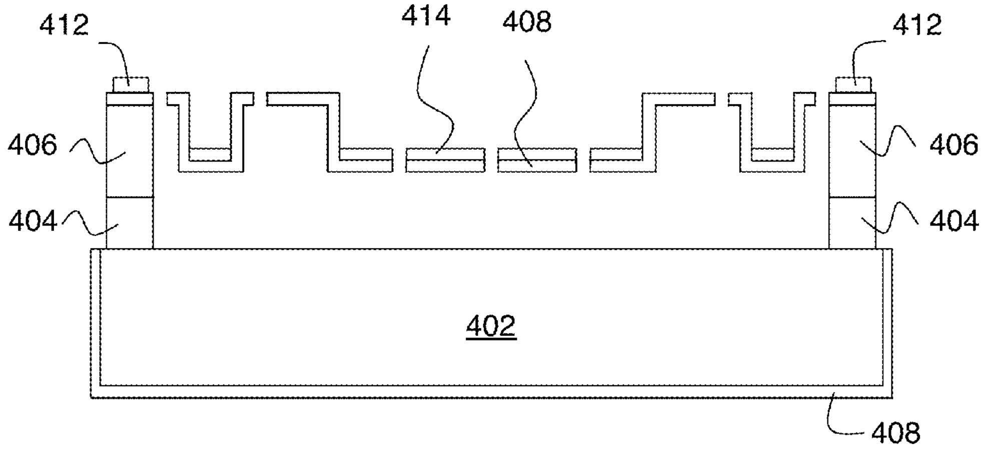
Figure 4K:
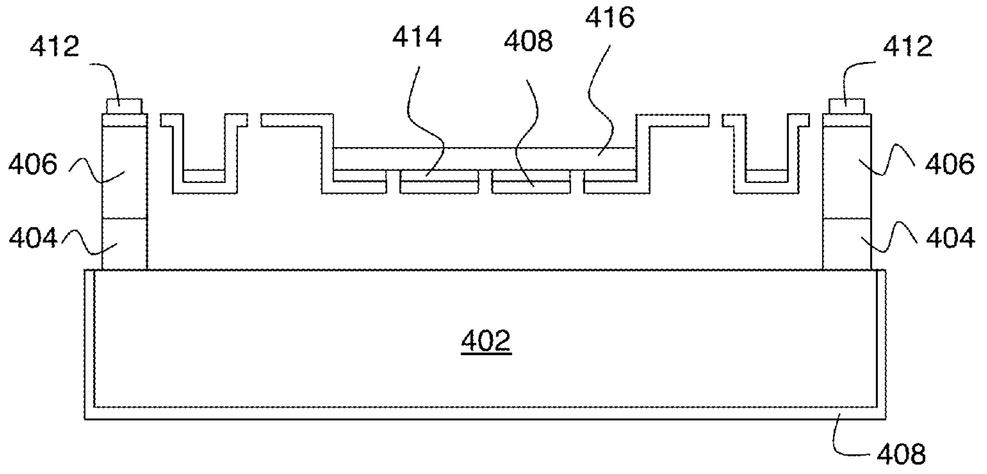

FIG. 4J shows the result of sputtering about 50 nm of tungsten 414 onto the suspended silicon carbide electrode. Tungsten 414 will eventually become the tungsten intermediate layer of the examples of FIGS. 4K and 5. FIG. 4K shows the result of depositing the activation layer 416. As indicated below, this deposition can be of a precursor material (e.g., a carbonate such as $BaCO_3$) which is reduced to a corresponding oxide in subsequent processing. Activation layer 416 is also the activation layer of the example of FIG. 5.

Although this is a preferred fabrication sequence, some of the experimental devices deviated from this sequence. Fabricated devices included:

1) Bare SiC control device. Fabrication of these devices ends at FIG. 4H. These devices could use silicon 402 as the collector for measurement of TEC operation, which is why the preceding description makes note of the possibility of choosing the gap between the collector and the SiC support structure via fabrication.

2) SiC/activation layer devices. The step of FIG. 4J is omitted, so no tungsten intermediate layer is present. Since the activation layer 416 faces up, the collector for TEC measurements was provided on a separate test fixture (described below).

3) SiC/W/activation layer devices. The steps of FIGS. 4A-H and 4J-K were all performed. These devices were also characterized with the test fixture described below.

Adsorbed cesium or barium reduce the work function of poly-SiC and can improve the thermionic current from the emitter. However, cesium reacts chemically with both silicon and silicon oxide, especially at elevated temperatures, and therefore we used barium-based coatings in μ-TECs to reduce the work-function of the SiC emitter.

B. Mechanically Robust Suspended Micro-Emitters that Incorporates a Thin Tungsten Coating for Better Adhesion of BaO/SrO/CaO For these devices, the suspended SiC emitters were sputtered with ~50 nm of tungsten. They were then coated with a lacquer containing $BaCO_3$, $SrCO_3$ and $CaCO_3$ to a thickness of about 25 μm. Nitrocellulose was used as the binder, with amyl acetate as solvent and carrier. During subsequent vacuum processing, the emitter is elevated in temperature to 350° C. for binder burnout. A further increase to about 800° C. permits reduction of carbonates to BaO, SrO and CaO. At this point, a molecular bond forms between the tungsten substrate and the oxides. The tungsten reacts with the BaO to produce free barium.

The two main components of the TEC are the emitter and the collector, separated by the optimal vacuum gap (in the micron range) to maximize the energy conversion efficiency. Because we were only able to coat the front side (the side facing up in FIG. 4K) of the suspended SiC emitter, we need to locate the collector on the top, and the emitter-collector gap should be less than 100 μm to minimize space charge current limitations. Thus a test fixture was used to provide a collector disposed at a suitable position relative to the emitter for the experiments.

Figure 5:
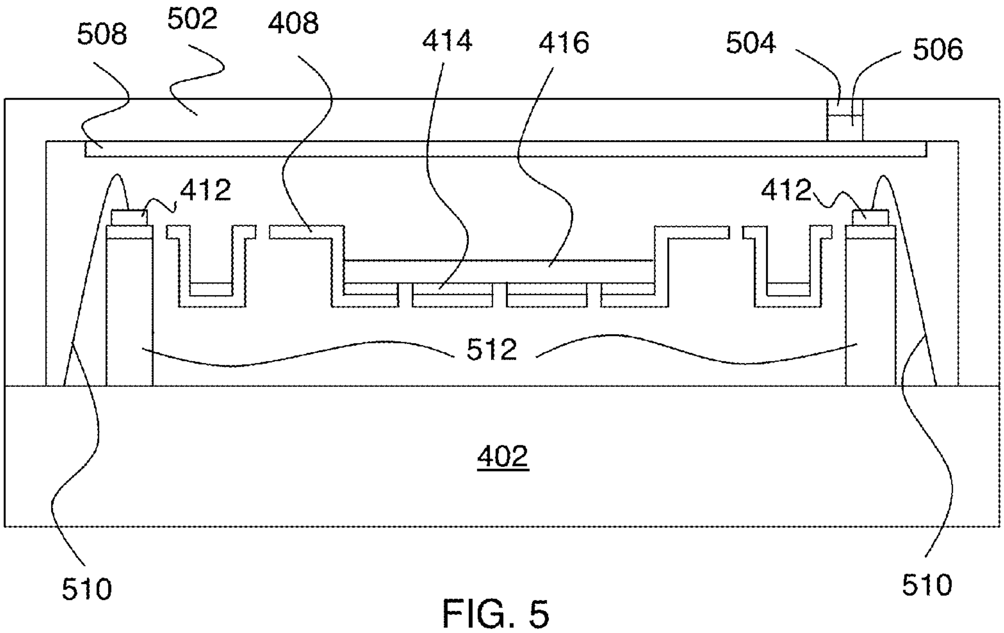
FIG. 5 shows an encapsulated thermionic energy converter according to an embodiment of the invention.

However, in preferred embodiments a configuration as shown in FIG. 5 can be employed. Here a structure as fabricated above is hermetically sealed by a cap 502 which can be glass. A collector electrode 508 can be disposed at a suitable distance above the emitter. Here the emitter includes SiC support structure 408, tungsten intermediate layer 414 and activation layer 416. Electrical contact to the collector can be made through a via including gold 504 and silicon 506. Bond wires 510 can be used to connect SiC 408 to the silicon substrate 402. Here the posts from which the SiC 408 is suspended are schematically shown as 512.

Figure 6:
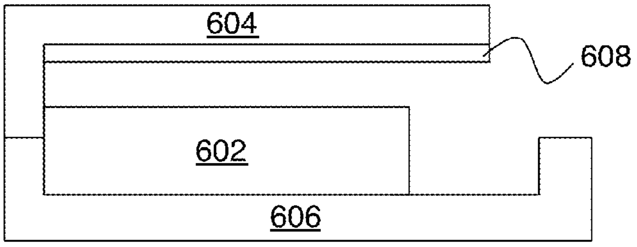
FIG. 6 shows a measurement arrangement used in the present experimental work.

FIG. 6 schematically shows the test fixture that was used for these experiments. 602 is the emitter under test. 608 is a transparent indium-tin-oxide electrode that serves as the collector. 604 is a glass wafer and 606 is a silicon carrier wafer. To make this test fixture, the Pyrex® wafer 604 was coated with 300 nm thick polysilicon using an LPCVD furnace. Then, the polysilicon was patterned on both the top and the bottom using dry etch for the vias and the cavity. The Pyrex® wafer was soaked in 49% HF for ~1 hr. Then, the polysilicon was etched with $XeF_2$ and a 200 nm thick layer of indium tin oxide (ITO) 608 was deposited on the patterned Pyrex® wafers. Before placing the SiC emitter chip 602 onto the Si carrier wafer 606, the SiC emitter was grounded to the original silicon substrate and the silicon substrate was electrically connected to the Si carrier. The transparent collector covers the die entirely. The whole structure can be vacuum encapsulated as described below and can also operate as a stand-alone μ-TEC.

C. Vacuum Encapsulated μ-TECs

μ-TECs require vacuum to operate with high conversion efficiency. We have previously encapsulated small μ-TEC arrays. While the bonding was successful, our initial experiments suggested that the packaging was not fully hermetic, and the cavity eventually filled with ambient air to almost atmospheric pressure. Because the bonding between the SiC layer and the Pyrex® glass was not reliable, we modified the fabrication process to achieve a hermetic bond between a crystalline silicon layer and the Pyrex® glass. In one experiment, a parallel-connected 3×3 μ-TEC array was fabricated. Since all TECs were connected in parallel via the bottom substrate, only two contacts were needed to measure the I-V characteristic.

The detailed fabrication process for this example is shown on FIGS. 7A-H and 7J-N. For this process, we needed an extra layer for the feedthroughs to the suspended SiC emitter. To summarize the following, we used an SOSOI (silicon on silicon on insulator) wafer instead of an SOI wafer to get the feedthroughs to the suspended SiC emitter via the substrate. The μ-TECs were encapsulated using a 500-μm-thick Pyrex® 7740 wafer with 250-μm-deep wet-etched cavities. The glass wafer was then anodically bonded to the silicon collector layer to encapsulate each array, which created a hermetic seal.

Figure 7A:
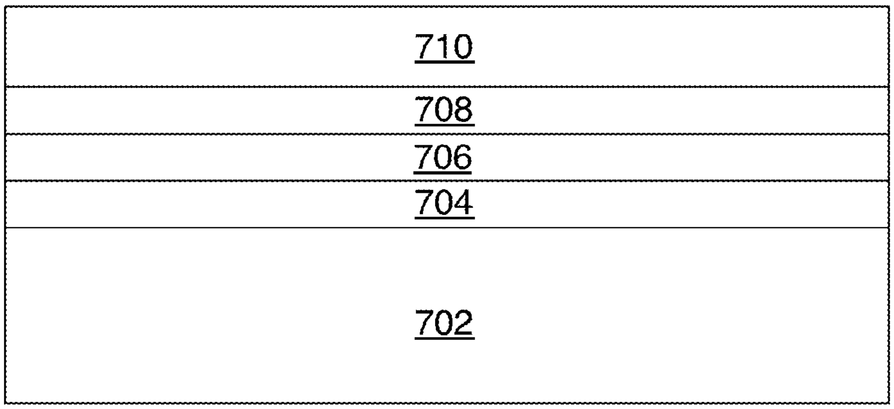
FIGS. 7A-H and 7J-N show a second exemplary fabrication sequence.
Figure 7B:
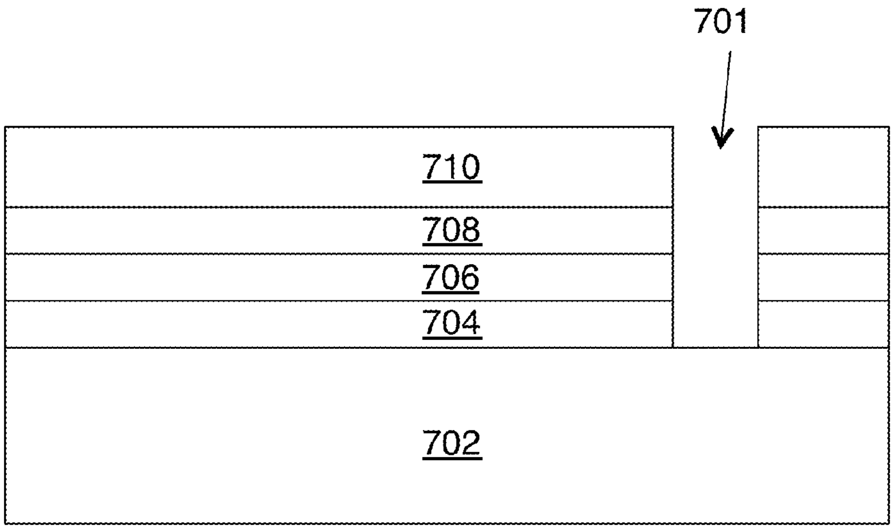
Figure 7C:
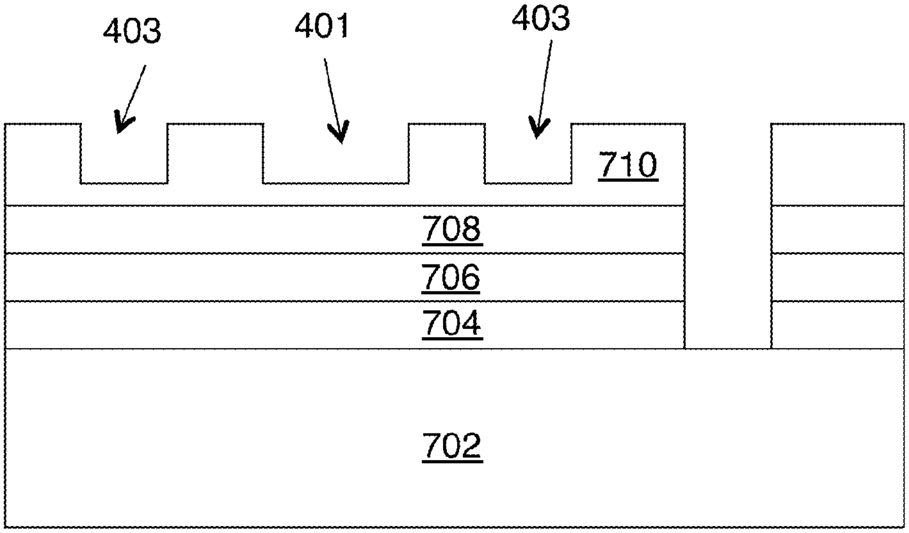
Figure 7D:
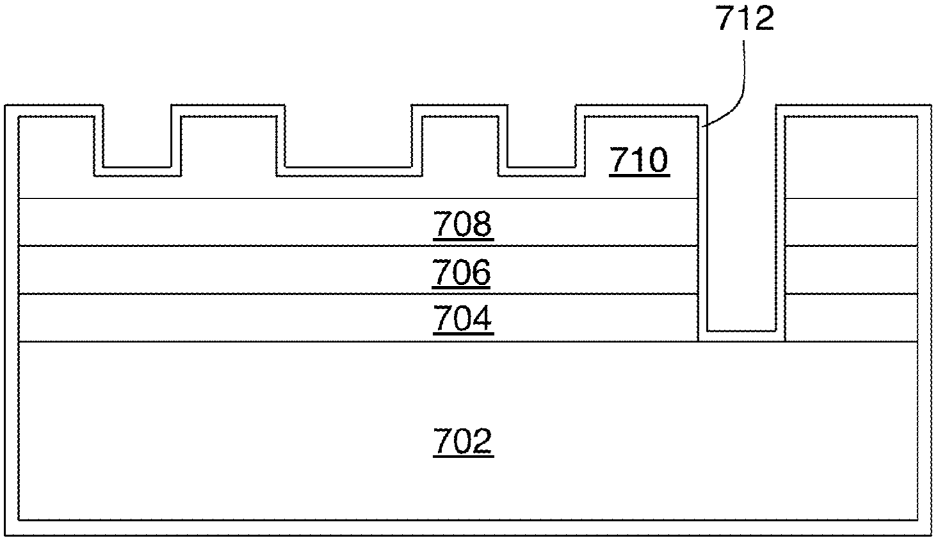
Figure 7E:
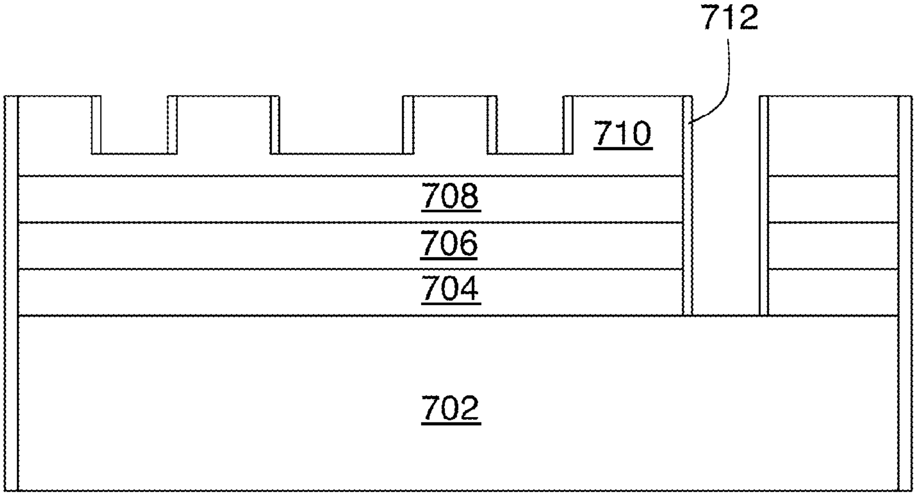
Figure 7F:
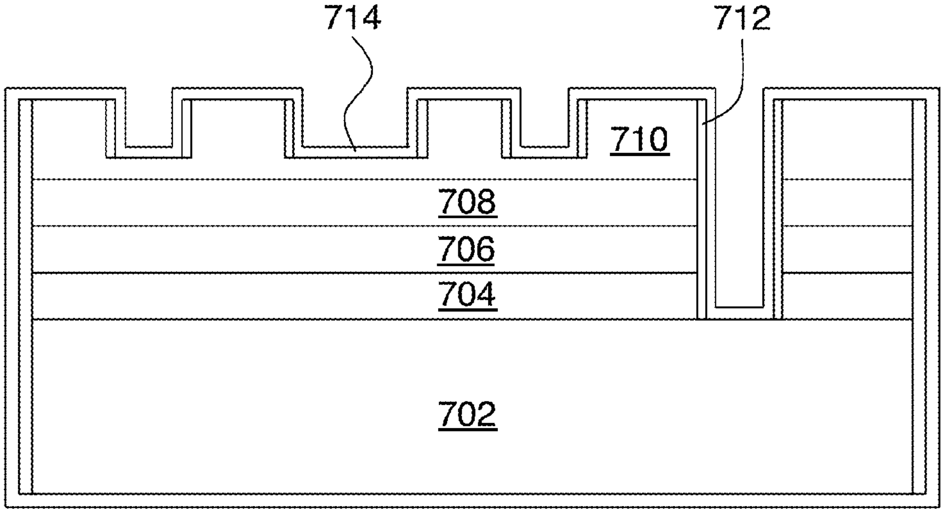
Figure 7G:
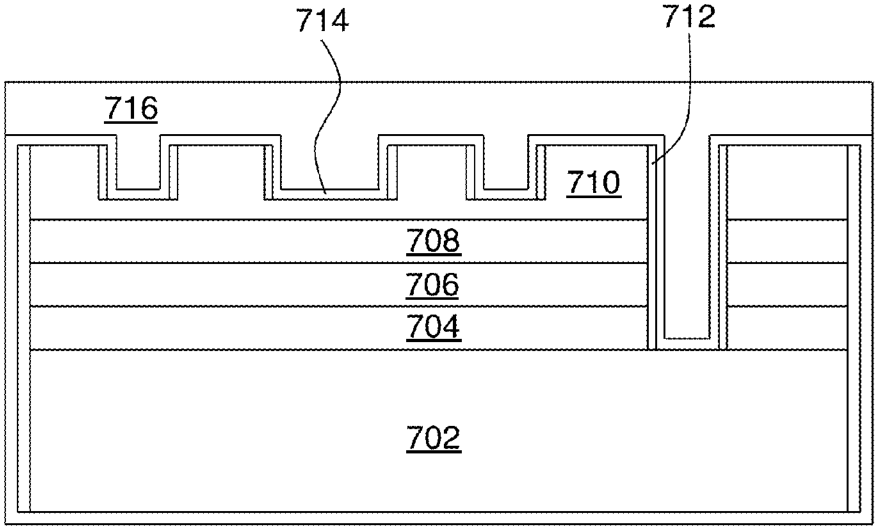
Figure 7H:
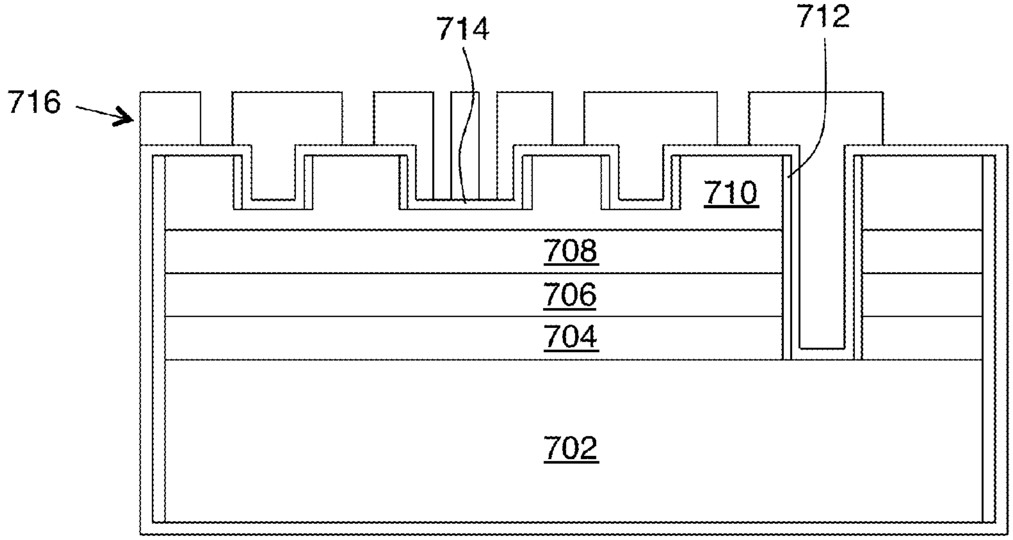
Figure 7J:
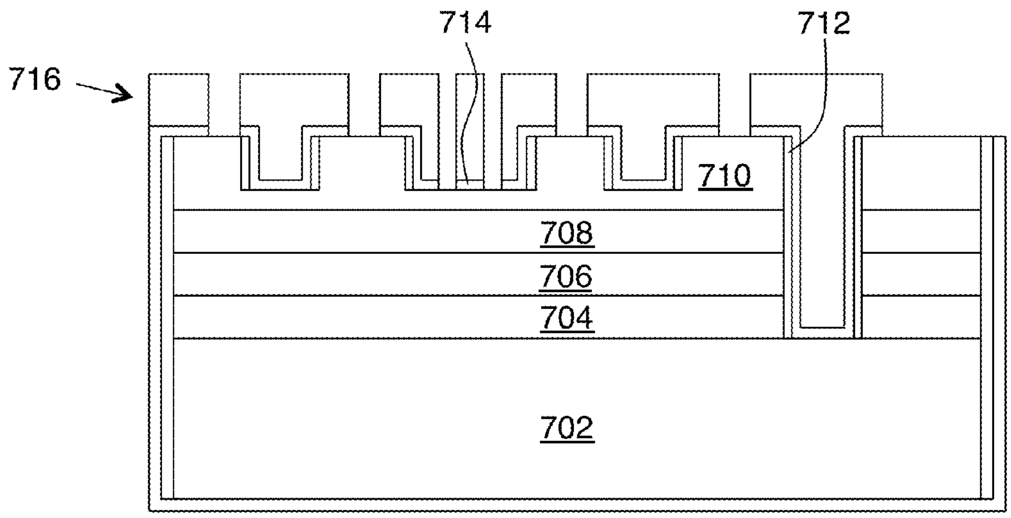
Figure 7K:
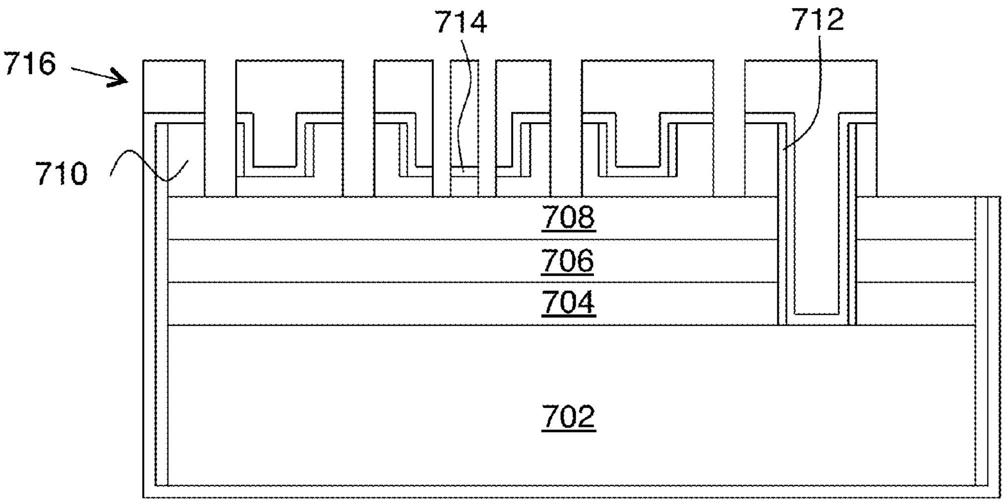
Figure 7L:
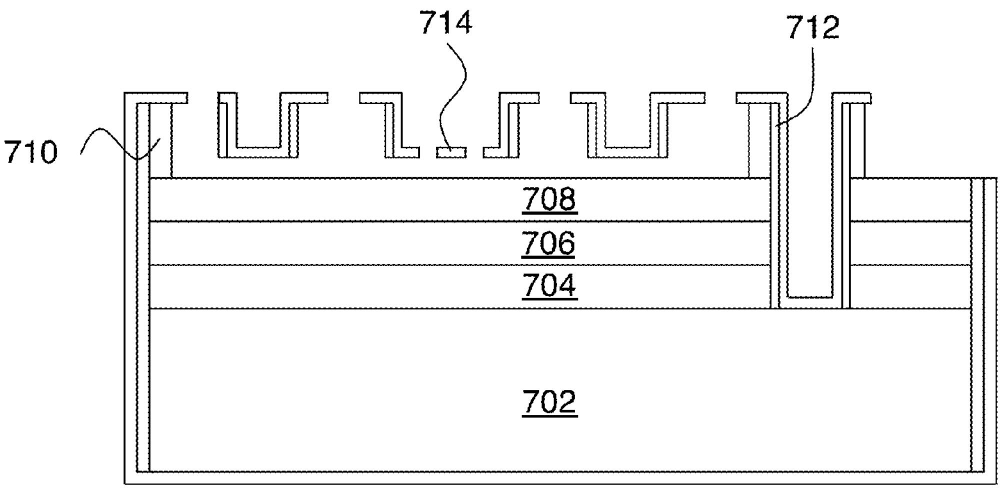
Figure 7M:
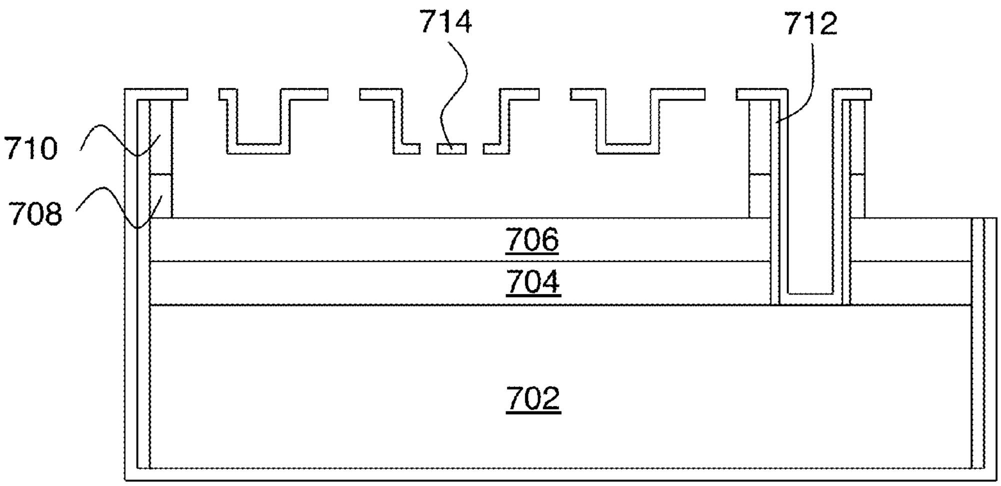
Figure 7N:
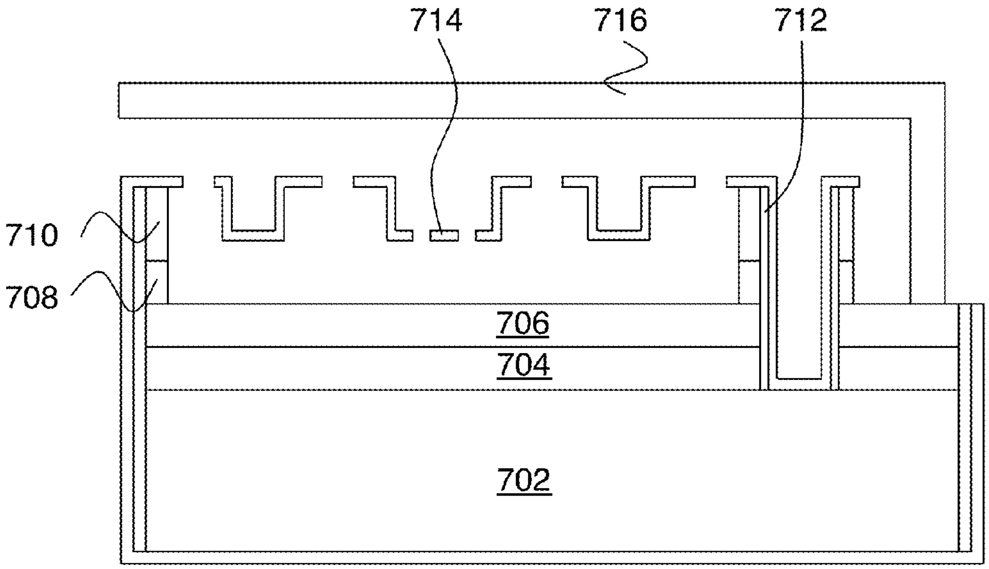

FIG. 7A shows the initial SOSOI wafer. Here 710 is silicon, 708 is buried oxide, 706 is silicon, 704 is buried oxide and 702 is the silicon substrate. FIG. 7B shows definition of via feedthroughs (e.g., 701 on the figure). FIG. 7C shows defining the U-shaped legs (403) and central plate (401) of the eventual SiC electrode. FIG. 7D shows deposition of insulator 712 which will eventually serve to isolate the SiC structure from the middle silicon layer 706. FIG. 7E shows the result of etching insulator 712 to open up the bottoms of the trenches. FIG. 7F shows deposition of SiC layer 714. Film stress in the SiC structure can be reduced by annealing after this depositions. Note that the SiC layer 714 is insulated from middle silicon layer 706 by insulator 712. FIG. 7G shows deposition of a thick photoresist 716. FIG. 7H shows patterning of photoresist 716 to define the SiC electrode. FIG. 7J shows etching of the SiC 714. FIG. 7K shows an etch of silicon layer 710 that serves to minimize the undercut on the contact area. FIG. 7L shows removal of photoresist 716 followed by release of the SiC electrode by an undercut etch of layer 710. FIG. 7M shows etching buried oxide 708 to expose silicon layer 706 which can serve as the collector electrode. FIG. 7N shows encapsulation by anodic bonding of a Pyrex® glass wafer 716 to the middle silicon layer 706. The resulting structure provides a SiC emitter electrode 714 integrated with a Si collector electrode 706 where the SiC emitter is electrically connected to substrate 702 while being insulated from silicon layer 706. This process can be modified to deposit a tungsten adhesion layer followed by an activation layer. In such cases, the collector electrode can be disposed above the SiC emitter, e.g., as shown on FIG. 5.

II. Experiment

A. Experimental Setup

A μ-TEC was placed in a high vacuum chamber ($<10^{-6}$ Torr) and optically heated by focusing the output of a 500 mW blue laser diode (440-455 nm) onto a ~750 μm diameter spot. The temperatures were measured using a PYRO Micro-therm optical pyrometer.

B. Thermionic Emission Current Measurements

To measure the work function of the micro-emitter, the emitter was grounded, and the external metal collector, located 1-2 cm away, was biased 80-120V to collect most of the emitted electrons from the emitter.

Figure 8:
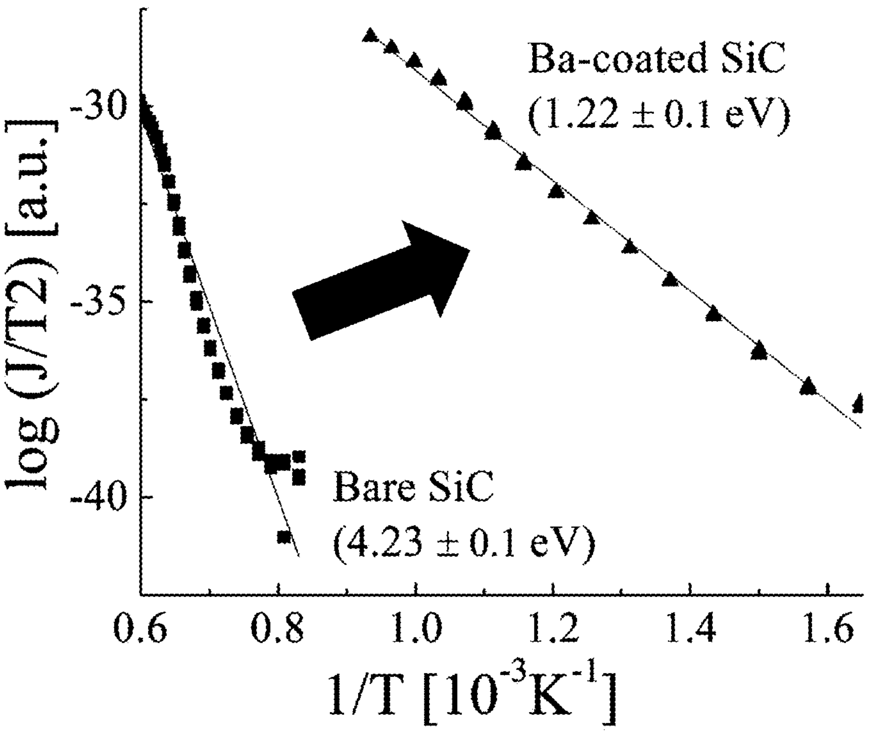
FIG. 8 shows the difference between a bare SiC emitter and a SiC emitter coated with Barium.

Our previous investigations demonstrated that Ba or BaO coating reduces the work function of the SiC emitter to ~2.1 eV and increases the thermionic current by 5-6 orders of magnitude. Our most recent results show that Ba coating reduces the work function of the SiC emitter to as low as 1.22 eV. More specifically, FIG. 8 shows the Richardson plot for the pure SiC emitter and the Richardson plot for the barium coated SiC emitter. The work function of the barium-coated SiC obtained from the fit was approximately 1.22 eV. This is a key step toward realizing a more efficient thermionic energy converter; however, barium oxide decomposed or desorbed from the SiC emitter above 1600 K, and desorption occurred immediately with optical heating from the BaO-coated side, which made the energy conversion efficiency measurements impossible.

C. Tungsten Coated SiC for Low Work-Function, Mechanically and Thermally Robust Emitters of μ-TECs To address the problem of decomposition and desorption, we combined the robust SiC suspended structure and a thin Tungsten coating for better adhesion of BaO/SrO/CaO. Subsequently, we optically heated the suspended emitter at a pressure below $3\times10^{-6}$ Torr. During activation at 900° C., an electric field is applied to the emitter surface. The tungsten reacts with the BaO to produce free barium. Free barium lying on tungsten produces an low work function of less than 2 eV. In conjunction with a semiconductor layer including BaO, SrO, and CaO, the overall work function can be as low as 1.4 eV. The visual appearance of the BaO-based coating changes after the activation, but still gives a work function of ~1.7 eV.

Figure 9:
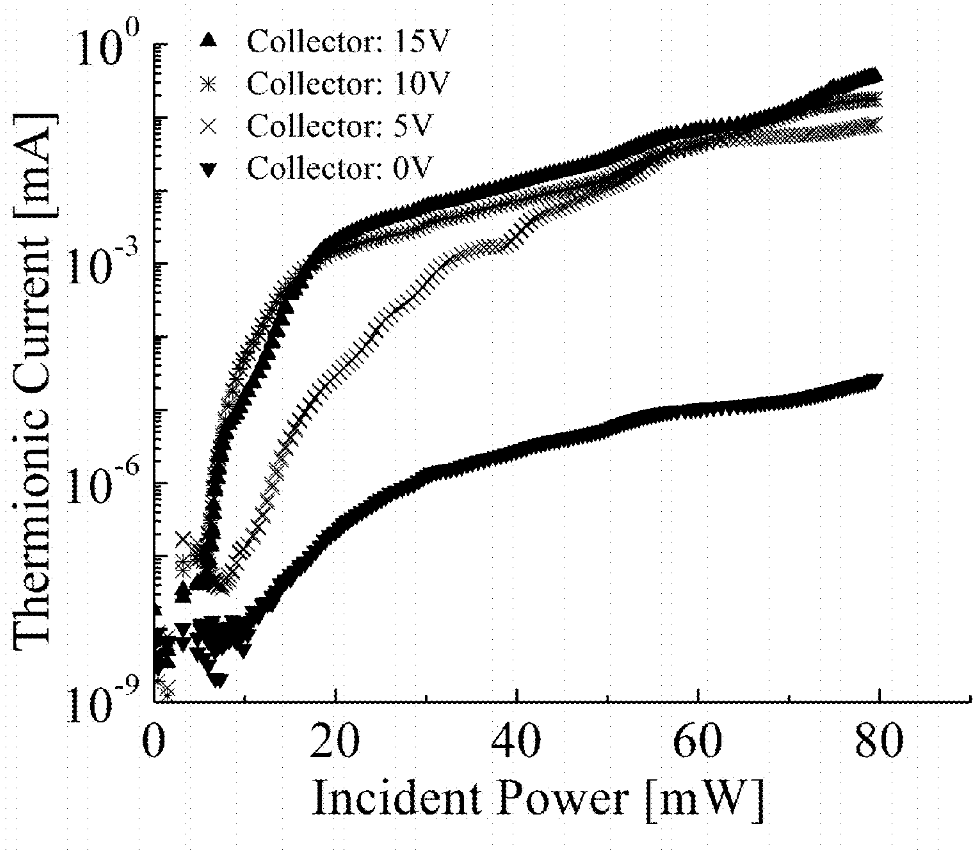
FIG. 9 shows measured thermionic current vs. incident optical power.

With this sample, we measured a thermionic current of approximately 0.4 mA at relatively low temperatures by applying 5-20 V to a transparent collector located 100-200 μm away from the emitter. The work function of the BaO- and Tungsten-coated SiC emitter obtained from the fit was approximately 1.7 eV. It has been previously reported that the lowest work function of the phosphorus-doped polycrystalline diamond films is 0.9 eV. Combining the emitter work-function of 1.7 eV, and the collector work-function of 0.9 eV, an output voltage of ~0.8V can be achieved. Assuming an output voltage of 0.8V, achievable with optimal spacing of the emitter and collector (gap <10 μm), our μ-TECs can convert the estimated 70 mW of optical power incident on the emitter to 0.32 mW of electrical power, corresponding to conversion of about 0.5%. FIG. 9 shows these results.

Figure 10A:
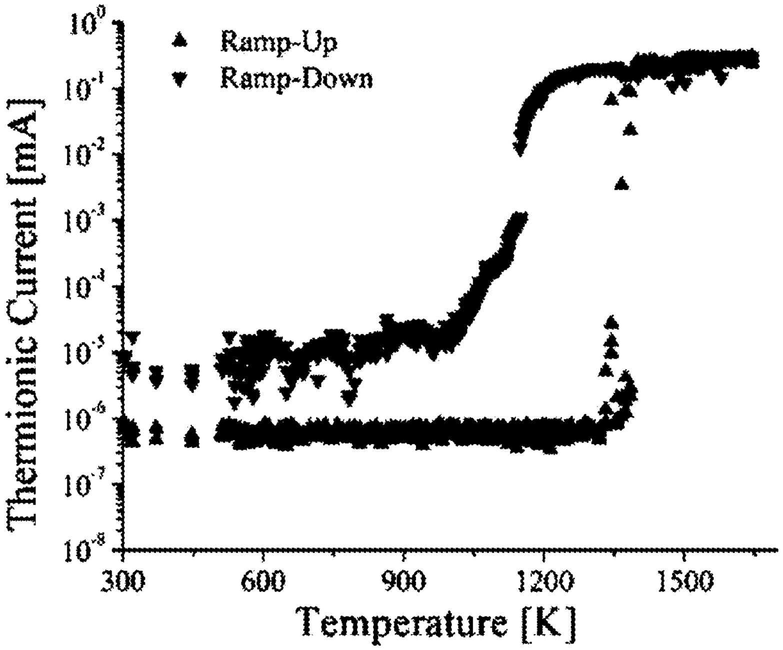
FIG. 10A shows ramp-up and ramp-down data for thermionic current vs. temperature.
Figure 10B:
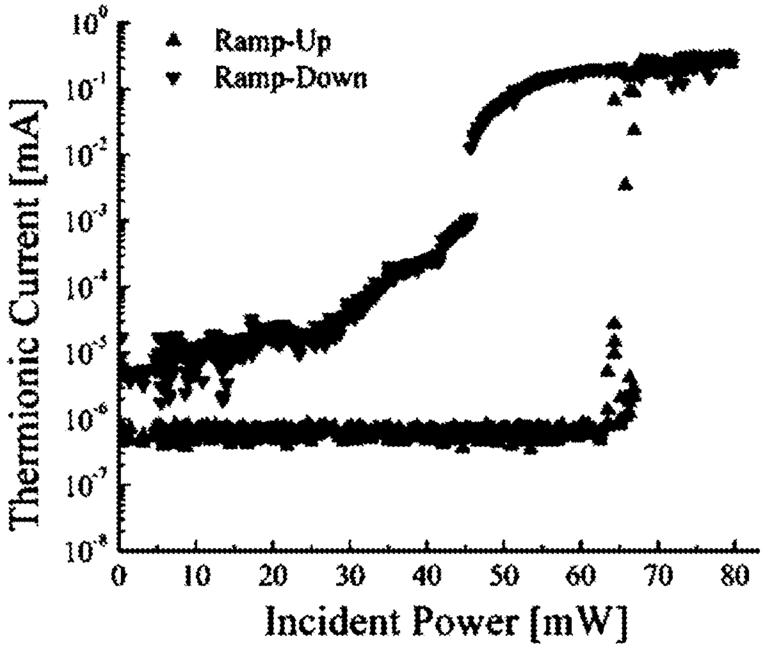
FIG. 10B shows ramp-up and ramp-down data for thermionic current vs. incident optical power.

In another experiment, the suspended emitter was optically heated at a pressure below $3\times10^{-6}$ Torr. With this sample, we measured approximately 400 μA at relatively low temperatures by applying 1000V at a metal collector (anode) located ~5 cm away from the emitter. Assuming an output voltage of 1V, the estimated conversion efficiency would be ~1% (FIGS. 10A-B). This is an important finding because it proves that the BaO is indeed reducing the work function of tungsten. FIG. 10A shows ramp-up and ramp down results for thermionic current vs. temperature. FIG. 10B shows ramp-up and ramp down results for thermionic current vs. incident optical power. The Child-Langmuir law predicts a current density of 3 $mA/cm^2$ with a collector voltage of 1000V, ~5 cm away. The current density of this experiment is approximately 0.4 $mA/(0.05\ cm)^2=160\ mA/cm^2$. We note that since our geometry is not planar, the space charge limit would be larger than what that Child-Langmuir formula would predict, indicating that the thermionic current could exceed 1 mA.

D. μ-TEC Encapsulation

Figure 11:
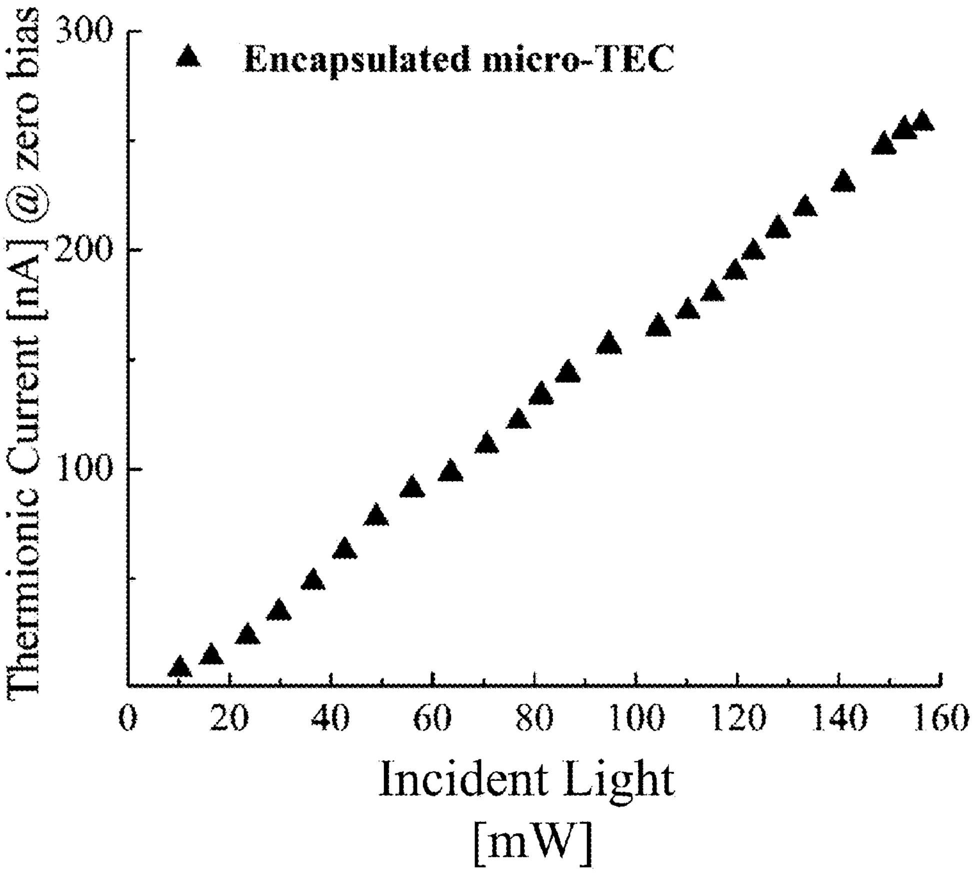
FIG. 11 shows measured thermionic current from an encapsulated thermionic energy converter.

The encapsulated micro-emitter was heated with the blue laser using the same setup described earlier but without running the vacuum pump. As shown on FIG. 11, the measured thermionic current was ~280 nA when the incident power was ~150 mW at zero bias between the emitter and the collector. This very low thermionic current is primarily due to the high work function of bare SiC. This μ-TEC encapsulation was done without BaO/SrO/CaO coating. This SiC emitter was visually observed to glow in operation, which strongly suggests that the vacuum level inside the cavity was less than 1 Torr and that the encapsulation was hermetic because we previously determined that the SiC emitter could glow only when the vacuum level was less than 1 Torr and the heat conduction by air was therefore negligible.

While the vacuum encapsulation was successful, our initial I-V characteristic measurements suggest that the oxide layer between the substrate and the silicon collector was damaged due to the high voltage during the bonding process. This damage can be avoided by electrically shorting the substrate and the silicon collector such as coating the edge of wafer with conductive material.

III. Conclusion

We combined a poly-SiC suspended structure and a thin tungsten coating for better adhesion of BaO/SrO/CaO, and demonstrated low work-function, mechanically and thermally robust emitters of μ-TECs. In addition, we have successfully encapsulated small μ-TEC arrays using an anodically bonded Pyrex® wafer. The alkali metal can be incorporated into wafer-bonded vacuum encapsulation.

The invention claimed is:

1. An emitter for use in a thermionic energy converter, the emitter comprising:

a silicon carbide support structure, a tungsten intermediate layer disposed on the silicon carbide support structure, and an activation layer disposed on the tungsten intermediate layer.

2. The emitter of claim 1, wherein the activation layer comprises an alkaline earth oxide.

3. The emitter of claim 2, wherein the activation layer comprises one or more materials selected from the group consisting of: strontium oxide, calcium oxide and barium oxide.

4. The emitter of claim 1, wherein the silicon carbide support structure is suspended above a wafer substrate and includes one or more support members having a U-shaped cross section to provide mechanical rigidity.

5. The emitter of claim 1, wherein a thickness of the tungsten intermediate layer is between 2.5 nm and 15 nm.

6. A thermionic energy converter comprising the emitter of claim 1 and a collector electrode.

7. The thermionic energy converter of claim 6, wherein the thermionic energy converter is configured to provide photon-enhanced thermionic energy conversion.

8. The thermionic energy converter of claim 6, wherein a gap between the emitter and the collector electrode is less than about 10 microns.

9. The thermionic energy converter of claim 6, further comprising a hermetically sealed package enclosing the emitter and the collector electrode and configured to provide a pressure of 1 Torr or less between the emitter and the collector electrode.

* * * * *